Aug. 7, 1934.　　　　W. AMES　　　　1,968,866
GAUGE
Filed May 13, 1931　　3 Sheets-Sheet 1

Inventor:
Warren Ames
By Emery Booth Varney & Townsend
Att'ys

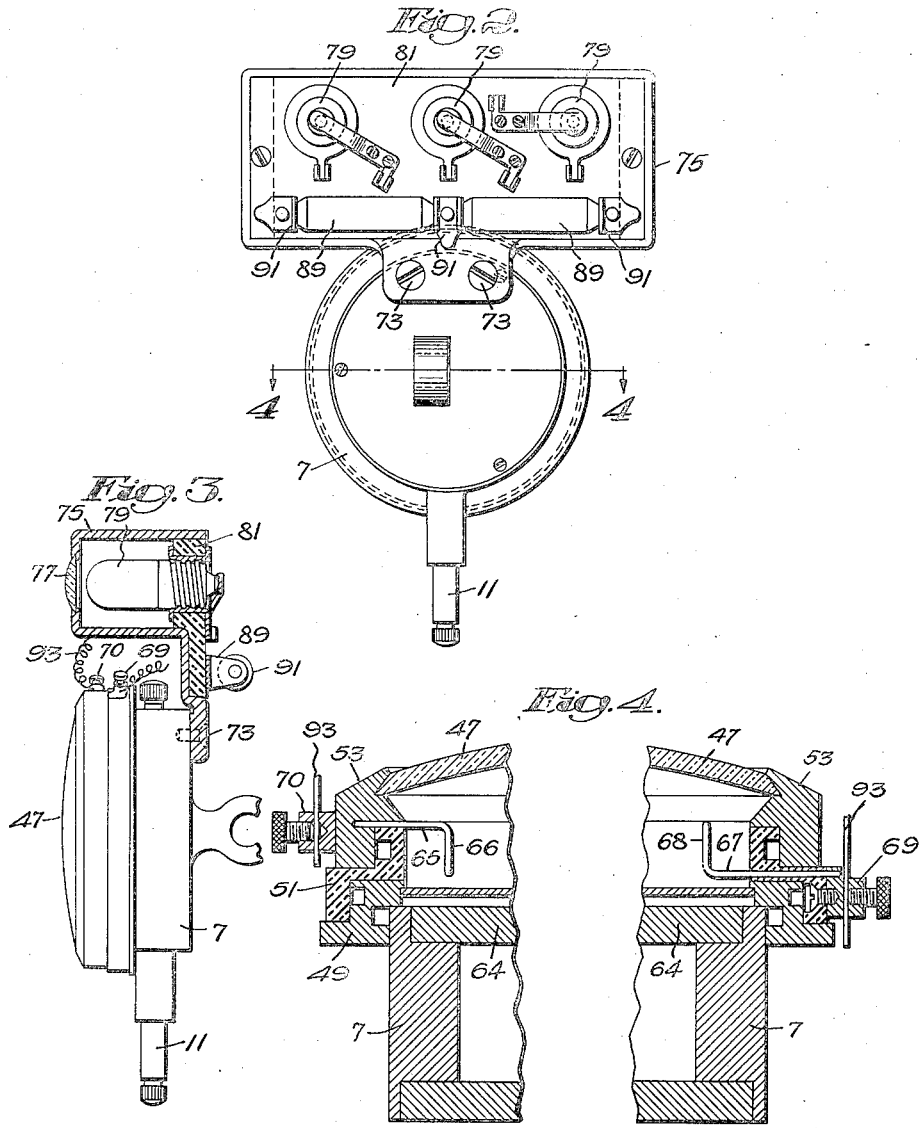

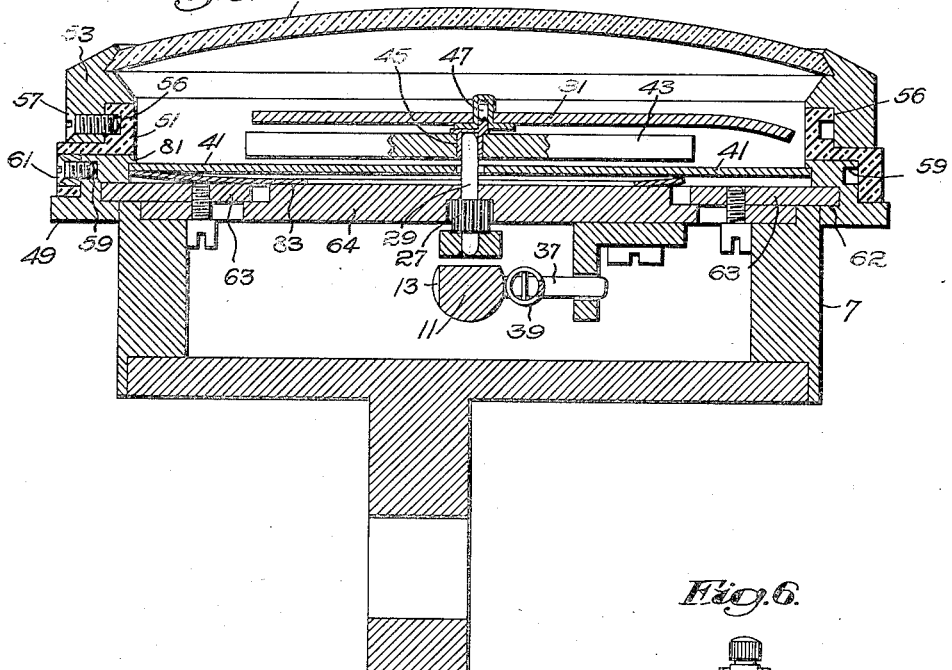

Patented Aug. 7, 1934

1,968,866

UNITED STATES PATENT OFFICE 1,968,866

GAUGE

Warren Ames, Newton, Mass.

Application May 13, 1931, Serial No. 537,018

13 Claims. (Cl. 200—56)

My invention relates to measuring instruments as, for example, distance gauges for comparing and measuring work.

The invention will be best understood from the following description when read in the light of the accompanying drawings showing an embodiment of the invention, the scope of which latter will be more particularly pointed out in the appended claims.

In the drawings:—

Fig. 2 is a rear view on a smaller scale of the indicating parts of the gauge constructed according to Fig. 1;

Fig. 3 is a side elevation of the portion of the gauge shown in Fig. 2 with parts in section;

Fig. 4 is a section on the line 4—4 of Fig. 2, with parts omitted and broken away, and, for convenience of illustration, the contacts moved into the same plane;

Fig. 5 is a section on the line 5—5 of Fig. 1 with the indicator hand and magnet moved into operative position;

Figure 1:
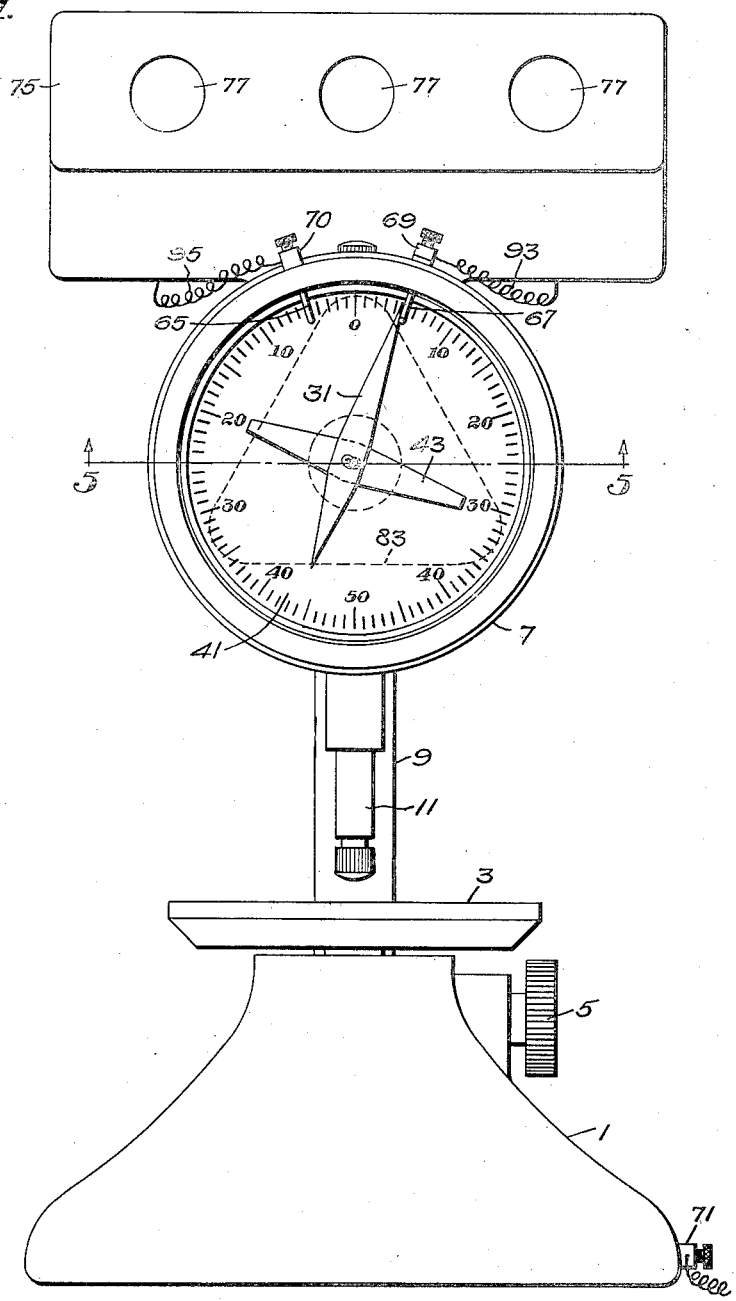
Fig. 1 is an elevation of a distance gauge of the comparator type constructed according to the invention.

Fig. 6 diagrammatically shows the gear mechanism of the gauge; and

Fig. 7 is a schematic wiring diagram of the electrical circuits associated with the gauge.

The gauge illustrated in the drawings comprises a base 1 upon which is supported a work table 3, the latter being vertically adjustable relative to the base and adapted to be secured in adjusted positions by a set screw 5. Above the work support is a casing 7 secured to the base by a vertical standard 9, and from the casing projects a moveable contact feeler 11 adapted to engage with work placed upon the work table, the construction so far described being well known to those skilled in the art.

The gauge mechanism contained within the casing 7 may be of any convenient construction. For example, as somewhat diagrammatically illustrated in Fig. 6, the contact feeler 11, which is suitably guided in the casing, may be formed with rack teeth 13 with which meshes a rack pinion 15, the spindle 17 of the latter carrying a gear 19 meshing with a pinion 21. The pinion 21 is fixed to a spindle 23 carrying a gear 25 which meshes with a center pinion 27 carried by a spindle 29 (Fig. 5), the latter for actuating the indicator hand 31 in a manner which will be presently described. Conveniently, the gauge may be provided with a gear 33 normally urged to rotate in one direction by a torsion spring 35, this gear being an idle gear meshing with the center pinion 27. As shown, the contact feeler 11 is provided with a laterally projecting pin 37 to one end of which is attached a tension spring 39 connected at its opposite end to the casing 7. The spring 39 serves to urge the contact feeler toward the work table 3.

It will be understood, that with the above construction, the spindle 29 is rotated in predetermined relation to the distance between the lower end of the contact feeler and the upper surface of the work table 3, so as to rotate the indicator hand 31 relative to the dial 41 carried by the casing 7. As shown, the spindle 29 has rigidly secured thereto a bar magnet 43, the latter being perforated adjacent its center and receiving a bushing 45 which surrounds and frictionally fits the upper end of the spindle 29. Further, as shown, the bushing 45 carries an upwardly projecting spindle 47 in slightly eccentric relation to the spindle 29. On the spindle 47 is mounted the indicator hand 31, which latter is of magnetic material and is freely rotatable relative to the spindle 47 and the magnet 43. By this construction, when the magnet 43 is rotated, the indicator hand will rotate with it, but when rotation of the indicator hand is prevented by engagement with contact members hereinafter mentioned, the magnet 43, being out of the path of said contacts, may still rotate, thus preventing injury to the delicate mechanism of the gauge which might otherwise be caused if the indicator hand were fixed to the spindle 29.

As shown, the casing has mounted thereon a rotatable ring 49 which preferably is of metal. Carried by the ring 49 in rotatable relation thereto is a second ring 51, preferably formed of insulating material, such as molded bakelite, while mounted on the ring 51, in rotatable relation thereto, is a metal bezel ring 53 which carries the crystal 55. As shown, for securing the parts in assembled relation the ring 51 is provided with an annular groove 56 in which slidably fit the ends of one or more screws 57 carried by the bezel 53. Similarly the ring 49 is provided with an annular groove 59 in which slidably fit the ends of one or more screws 61 carried by the ring 51. For holding the ring 49 to the casing in rotatable relation thereto, said ring is provided with an annular groove 62 in which slidably fit the ends of one or more lugs 63 carried by the top plate 64 of the casing.

Referring particularly to Figs. 1 and 4, the bezel ring 53 carries a contact 65 having a depending portion 66, which latter is in the path of the indicator needle but out of the path of the magnet 43. The ring 51 of insulating material carries a contact 67 having the upwardly extending portion 68, which latter has the same relation to the paths of the magnet and indicator hand as the portion 66 of the other contact.

It will be observed, that when the magnet 43 is rotated sufficiently to move the indicator hand 31 against one or the other of the contacts 65 and 68, continued movement of the magnet will cause, due to the eccentric relation between the spindles 29 and 47, a longitudinal movement of the indicator hand relative to the contact, with the result that when the indicator hand thus strikes the contact, it "wipes" against the same insuring good electrical contact with it.

As illustrated, the contact 67 is in electrical communication with a binding post 69 carried by the ring 51, while the bezel ring carries in electrical communication therewith a binding post 70. The binding post 71 (Fig. 1) in electrical communication with the base 1 is likewise in electrical communication with the indicator hand which is grounded to the base by reason of the construction hereinbefore described consisting of metal parts except for the ring 51. By this means the indicator hand in effect constitutes the blade of a single pole double-throw switch, the other two contacts of which are the contacts 65 and 67 in the path of the indicator hand.

Herein the casing 7 has secured thereto, by screws 73, a casing 75 provided with three spaced "bull's-eyes" 77, behind which latter are electric lamps 79 carried by a panel 81 secured to the casing 75. Preferably, the bull's-eyes are of a different color, say, for example, the middle bull's-eye is amber, while the right hand bull's-eye as viewed in Fig. 1 is red, and the left hand bull's-eye is green. Conveniently, circuit connections are provided, controlled by the indicator hand and its cooperating contacts, for lighting and extinguishing the three lamps 79 in such a way that the middle or amber bull's-eye will be illuminated only when the indicator hand is between the two contacts and out of contact with both of them. This illumination of the amber bull's-eye, for example, will indicate that work placed upon the work table and contacted by the feeler 11 is between upper and lower limits of "tolerance", the latter as indicated by the position of the contacts 65 and 67 relative to the dial 41, while when the indicator hand is moved to contact with the left hand contact 65 as view in Fig. 1, which is in a position to correspond with the lower limit of tolerance, the middle or amber bull's-eye will be extinguished and the left hand or green bull's-eye will be illuminated, to indicate that the work is under the lower limit of tolerance, and similarly when the indicator hand is moved to contact with the right hand contact 67 corresponding to the upper limit of tolerance, the bull's-eye will be extinguished and the right hand or red bull's-eye will be illuminated to indicate that the work is over the upper limit of tolerance.

The dial 41 as shown engages at its periphery with the shoulder 81 formed on the ring 49, being frictionally held against said shoulder by the triangular-shaped leaf spring 83 which bears at opposite sides thereof against the under side of the dial and the upper surface of the top plate 64 of the casing 7. Thus by turning the ring 49 relative to the casing, the zero point on the dial, which latter turns with the ring 49, may be adjusted to coincide with the indicator hand 31 when the latter is in position to indicate the normal measurement of the work as determined by a fixed standard. The rings 51 and 53 which respectively carry the contacts 65 and 67 may be adjusted independently of each other and the dial to the desired positions relative to the latter which indicate the upper and lower limits of tolerance of the work. It will be observed by this construction, that the exact dimension of the work being measured may be observed when it is within the limits of tolerance, while the flashing of the lights will indicate quickly to the operator when the work is beyond the limits of tolerance.

Referring particularly to the wiring diagram shown by Fig. 6, the three lamps 79 may be energized in any convenient manner, say from a house lighting circuit through the step-down transformer 87. Conveniently, the center lamp as viewed in the diagram for illuminating the middle or amber bull's-eye, is of higher resistance than the right and left hand lamps for illuminating the green and red bull's-eyes, as, for example, the center lamp may be a 6 volt miniature lamp and the right and left hand lamps 2½ volt miniature lamps. It will be observed that with the indicator hand 31 in the position shown by the diagram, that is to say, out of contact with both contacts 65 and 67, a circuit will be established between the opposite terminals of the secondary winding of the transformer 87 through the center lamp 79 and the two resistors 89, each of which latter has one end thereof grounded to the frame of the instrument, these resistors conveniently being carried by clips 91 secured to the panel 81. If the indicator hand 31 is moved to contact with the contact 67, the right hand lamp 79 will be placed in circuit with the terminals of the secondary winding of the transformer 87 through the right hand resistor 89, and at the same time the center lamp will be extinguished due to the said right hand lamp 79 being in effect shunted across it. When the indicator hand contacts with the contact 65, the left hand lamp 79 is connected in circuit with the terminals of the secondary winding of the transformer 87 through the left hand resistor 89, and the center lamp 79 is again extinguished due to the left hand lamp 79 being in effect shunted across it.

The various terminals for the lamps 79 and resistors are shown in Fig. 2, and it is believed unnecessary to illustrate the actual wires employed for establishing the various circuit connections, as the same will be obvious to those skilled in the art from the wiring diagram. It will be observed, however, that conveniently flexible leads 93 and 95 will be provided for connecting the movable binding posts 69 and 70 to the appropriate terminals on the panel 81.

It will be understood that the present invention is not limited to distance gauges, but may be applied to any gauge having a movable indicating hand or the like which assumes a predetermined position in response to the value of the characteristic being measured by the instrument, which latter, for example, may measure temperature, pressure, liquid level, or other characteristics for which gauges and measuring instruments are commonly employed, and it likewise will be understood that wide deviations may be made from the form of the invention shown without departing from the spirit of the invention.

I claim:—

1. A micrometer gauge having, in combination, means constituting a support; a contact feeler actuated member, a movable indicator member, a normally rigid contact member, all of said members being carried by said support, said contact member being in the path of movement of said indicator member and acting as a positive stop for limiting its motion; and non-positive means operatively connecting said contact feeler actuated member to said indicator member comprising a multiplying train of gearing and an operatively yieldable magnetic connection between one of said members and said train.

2. A micrometer gauge having, in combination, means constituting a support; a contact feeler actuated member, a movable indicator member, a normally rigid contact member, all of said members being carried by said support, said contact member being in the path of movement of said indicator member and acting as a positive stop for limiting its motion; and non-positive means operatively connecting said contact feeler actuated member to said indicator member comprising a multiplying train of gearing operatively positively connected to said contact feeler actuated member and a magnet driven by said train in magnetic relation to said indicator member.

3. A micrometer gauge having, in combination, means constituting a support; a contact feeler actuated member, a movable indicator member, a pair of normally rigid contact members, all of said members being carried by said support, said contact members being in spaced relation in the path of movement of said indicator member and acting as positive stops for limiting its motion in opposite directions; and non-positive means operatively connecting said contact feeler actuated member to said indicator member comprising a multiplying train of gearing and an operatively yieldable magnetic connection between one of said members and said train.

4. A measuring instrument having, in combination, a support, an indicator member freely rotatable relative to said support, a second member rotatable relative to said support in predetermined relation to the value of the characteristic being measured by said instrument, said members being mounted in slightly spaced relation and one of said members being of magnetic material and the other a magnet whereby rotation of said second member will cause rotation of said indicator member, a contact member carried by said support in the path of movement of said indicator member but out of the path of movement of said second member, said contact member acting as a stop for said indicator member, and means actuated by relative rotation between said indicator member and said second member when said indicator member is in contact with said contact member to cause a wiping motion longitudinally of said indicator member between the latter and said contact member.

5. A measuring instrument having, in combination, a support, an indicator member freely rotatable relative to said support, a second member rotatably mounted in slightly eccentric relation and in slightly spaced relation to said indicator member, one of said members being of magnetic material and the other a magnet, means for rotating said second member in predetermined relation to the value of the characteristic being measured by said instrument, and a contact carried by said support in the path of movement of said indicator member but out of the path of movement of said second member acting as a stop for said indicator member.

6. A measuring instrument having, in combination, a support, a dial carried thereby, a magnet rotatable relative to said dial in predetermined relation to the value of the characteristic being measured by said instrument, an indicator hand of magnetic material freely rotatable relative to said dial in operative relation to said magnet and in slightly spaced relation thereto, and a pair of contact members carried by said support in adjustable relation to each other and to said dial, said contact members being in the path of movement of said indicator hand but out of the path of movement of said magnet and acting as stops to limit the movement of said indicator hand in opposite directions respectively, said dial being adjustable relative to said support along the path of movement of said indicator hand.

7. A measuring instrument having, in combination, a support, a dial carried thereby, a magnet rotatable relative to said dial in predetermined relation to the value of the characteristic being measured by said instrument, an indicator hand of magnetic material freely and rotatably mounted in slightly eccentric relation to said magnet and in slightly spaced relation thereto, and a pair of contact members carried by said support in adjustable relation to each other and to said dial, said contact members being in the path of movement of said indicator hand but out of the path of movement of said magnet and acting as stops to limit the movement of said indicator hand in opposite directions respectively.

8. A measuring instrument having, in combination, a support, a dial carried thereby, a magnet rotatable relative to said dial in predetermined relation to the value of the characteristic being measured by said instrument, an indicator hand of magnetic material freely rotatable relative to said dial in operative relation to said magnet and in slightly spaced relation thereto, a pair of contact members carried by said support in adjustable relation to each other and to said dial, said contact members being in the path of movement of said indicator hand but out of the path of movement of said magnet and acting as stops to limit the movement of said indicator hand in opposite directions respectively; and means responsive to relative rotation between said magnet and indicator hand for causing a wiping action longitudinally of said indicator hand between the latter and said contacts.

9. A measuring instrument having, in combination, a support, a dial carried thereby, a magnet rotatable relative to said dial in predetermined relation to the value of the characteristic being measured by said instrument, an indicator hand of magnetic material freely rotatably relative to said dial in operative relation to said magnet and in slightly spaced relation thereto, and a pair of contact members carried by said support in insulated relation to each other and to said indicator hand and in adjustable relation to each other and to said dial, said contact members being in the path of movement of said indicator hand but out of the path of movement of said magnet and acting as stops to limit the movement of said indicator hand in opposite directions respectively, said dial being adjustable relative to said support along the path of movement of said indicator hand.

10. A measuring instrument having, in combination, a casing, a bezel rotatably carried by said casing, a ring rotatable relative to said casing and bezel coaxially of the latter, a dial and a cooperating rotatable indicator hand, and contacts carried by said ring and bezel in the path of movement of said indicator hand.

11. A measuring instrument having, in combination, a casing, a dial rotatably adjustable relative to said casing, an indicator hand rotatable relative to said dial, a pair of rings carried by said casing in rotatable relation to each other and to said dial, and a contact member carried by each ring in the path of movement of said indicator hand.

12. A micrometer gauge having, in combination, a support, a movable indicator hand operatively carried by said support, a normally stationary dial cooperating with said hand and carried by said support in adjustable relation thereto along the path of movement of said hand, a normally stationary contact in the path of movement of said hand adjustable relative to both said support and dial along the path of movement of said hand and acting as a stop to limit the movement of the latter, a contact feeler actuated part carried by said support, a multiplying train of gearing operated by said contact feeler actuated part, and a freely yieldable magnetic clutch connection between said train and said hand.

13. A micrometer gauge having, in combination, a support, a movable indicator hand carried by said support, a normally stationary dial cooperating with said hand and carried by said support, a normally stationary contact in the path of movement of said hand acting as a stop to limit its movement, said dial and contact being adjustable relative to said support along the path of movement of said hand, a contact feeler actuated part carried by said support, a multiplying train of gearing operated by said contact feeler actuated part, and a freely yieldable magnetic clutch connection between said train and said hand.

WARREN AMES.